US012669653B2

(12) United States Patent
Dash et al.

(10) Patent No.: US 12,669,653 B2
(45) Date of Patent: Jun. 30, 2026

(54) OPTICAL SWITCHES INCLUDING A RING RESONATOR

(71) Applicant: GlobalFoundries U.S. Inc., Malta, NY (US)

(72) Inventors: Aneesh Dash, Bangalore (IN); Michal Rakowski, Ballston Lake, NY (US); Avijit Chatterjee, Bangalore (IN); Rupa Gopinath Minasamudram, Bangalore (IN)

(73) Assignee: GlobalFoundries U.S. Inc., Malta, NY (US)

( * ) Notice: Subject to any disclaimer, the term of this patent is extended or adjusted under 35 U.S.C. 154(b) by 300 days.

(21) Appl. No.: 18/376,864

(22) Filed: Oct. 5, 2023

(65) Prior Publication Data

US 2025/0116819 A1       Apr. 10, 2025

(51) Int. Cl.
*G02B 6/35* (2006.01)
(52) U.S. Cl.
CPC .................................. *G02B 6/3594* (2013.01)
(58) Field of Classification Search
CPC .............. G02B 6/3594; G02B 6/12007; G02B 6/29338; G02B 6/29353; G02B 2006/12145; G02B 6/35; G02F 1/0147; G02F 1/225; G02F 1/2257; G02F 1/3132; G02F 1/3133; G02F 1/3136
See application file for complete search history.

(56) References Cited

U.S. PATENT DOCUMENTS

| | | | | |
|---|---|---|---|---|
| 7,356,219 B2 * | 4/2008 | Faccio | ............... | G02B 6/29383 |
| | | | | 385/27 |
| 2012/0201492 A1 * | 8/2012 | Matsumoto | ........ | G02B 6/12007 |
| | | | | 385/24 |

(Continued)

FOREIGN PATENT DOCUMENTS

| | | |
|---|---|---|
| CN | 105322438 B | 9/2018 |
| CN | 116295830 A | 6/2023 |

OTHER PUBLICATIONS

David J Moss; "Sagnac interference in integrated photonics for reflection mirrors, gyroscopes, filters, and wavelength interleavers." arXiv:2302.13177; Feb. 25, 2023; available at https://doi.org/10.48550/arXiv.2302.13177.

(Continued)

*Primary Examiner* — John Bedtelyon
(74) *Attorney, Agent, or Firm* — Thompson Hine LLP; Anthony Canale

(57)       ABSTRACT

Structures for an optical switch and methods of forming such structures. The structure comprises a first waveguide core including a first portion and a second portion, a second waveguide core including a first portion and a second portion, a ring resonator having a first portion adjacent to the first portion of the first waveguide core and a second portion adjacent to the first portion of the second waveguide core, and an optical coupler coupled to the second portion of first waveguide core and the second portion of the second waveguide core. The first portion of the ring resonator is spaced from the first portion of the first waveguide core by (Continued)

a first gap over a first light coupling region, and the second portion of the ring resonator is spaced from the first portion of the second waveguide core by a second gap over a second light coupling region.

20 Claims, 6 Drawing Sheets

(56)                    References Cited

U.S. PATENT DOCUMENTS

| | | |
|---|---|---|
| 2019/0027898 A1 | 1/2019 | Bovington et al. |
| 2023/0268718 A1 | 8/2023 | Guo et al. |

OTHER PUBLICATIONS

L. Lu, L. Shen, W. Gao, L. Zhou and J. Chen, "Reconfigurable Silicon Photonic Processor Based on SCOW Resonant Structures," in IEEE Photonics Journal, vol. 11, No. 6, pp. 1-12, Dec. 2019, Art No. 6603312, doi: 10.1109/JPHOT.2019.2949268.

C. G. H. Roeloffzen et al., "Low-Loss Si3N4 TriPleX Optical Waveguides: Technology and Applications Overview," in IEEE Journal of Selected Topics in Quantum Electronics, vol. 24, No. 4, pp. 1-21, Jul.-Aug. 2018, Art No. 4400321, doi: 10.1109/JSTQE.2018.2793945.

European Patent Office, Extended European Search Report and Opinion issued in European Patent Application No. 24168618.7 on Oct. 15, 2024; 11 pages.

T. Hirokawa et al., "A Wavelength-Selective Multiwavelength Ring-Assisted Mach-Zehnder Interferometer Switch," in Journal of Lightwave Technology, vol. 38, No. 22, pp. 6292-6298, Nov. 15, 2020, doi: 10.1109/JLT.2020.3011944.

Lian-Wee Luo, Salah Ibrahim, Arthur Nitkowski, Zhi Ding, Carl B. Poitras, S. J. Ben Yoo, and Michal Lipson, "High bandwidth on-chip silicon photonic interleaver," in Optics Express, vol. 18, No. 22, pp. 23079-23087, Oct. 25, 2010, doi: 10.1364/OE.18.023079.

H. Arianfard, J. Wu, S. Juodkazis and D. J. Moss, "Three Waveguide Coupled Sagnac Loop Reflectors for Advanced Spectral Engineering," in Journal of Lightwave Technology, vol. 39, No. 11, pp. 3478-3487, Jun. 1, 2021, doi: 10.1109/JLT.2021.3066256.

M. Gad, J. Ackert, D. Yevick, L. Chrostowski and P. Jessop, "Ring Resonator Wavelength Division Multiplexing Interleaver," in Journal of Lightwave Technology, vol. 29, No. 14, pp. 2102-2109, Jul. 15, 2011, doi: 10.1109/JLT.2011.2157081.

R. -L. Chao et al., "Microring Optical Phase-Shifters With Low Driving-Voltage, Low Insertion Loss, and Small Residual Amplitude Modulation," in Journal of Lightwave Technology, vol. 39, No. 24, pp. 7740-7747, Dec. 15, 2021, doi: 10.1109/JLT.2021.3098347.

B. G. Lee and N. Dupuis, "Silicon Photonic Switch Fabrics: Technology and Architecture," in Journal of Lightwave Technology, vol. 37, No. 1, pp. 6-20, 1 Jan. 1, 2019, doi: 10.1109/JLT.2018.2876828.

Junfeng Song, Q. Fang, S. H. Tao, M. B. Yu, G. Q. Lo, and D. L. Kwong, "Proposed silicon wire interleaver structure," Optics Express 16, 7849-7859 (2008).

Junfeng Song, H. Zhao, Q. Fang, S. H. Tao, T. Y. Liow, M. B. Yu, G. Q. Lo, and D. L. Kwong, "Effective thermo-optical enhanced cross-ring resonator MZI interleavers on SOI," Optics Express 16, 21476-21482 (2008).

* cited by examiner

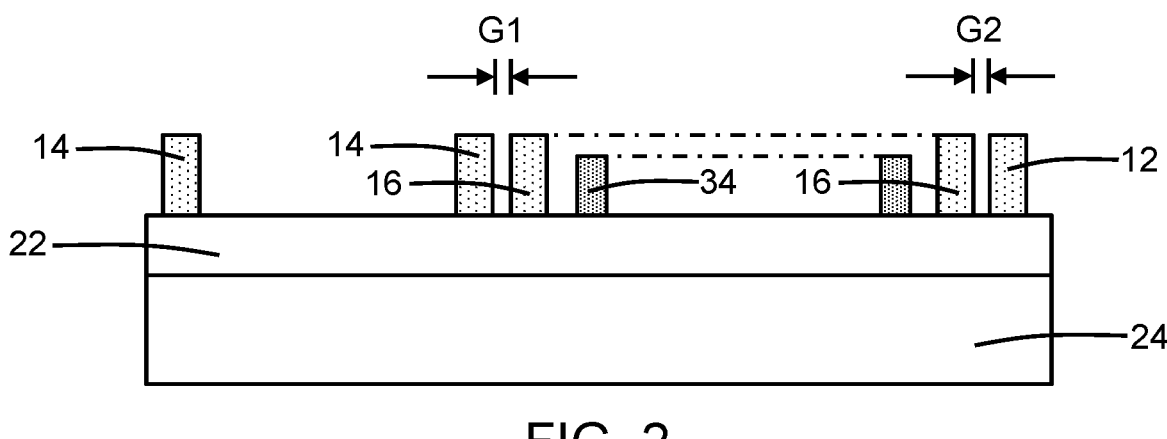
FIG. 2
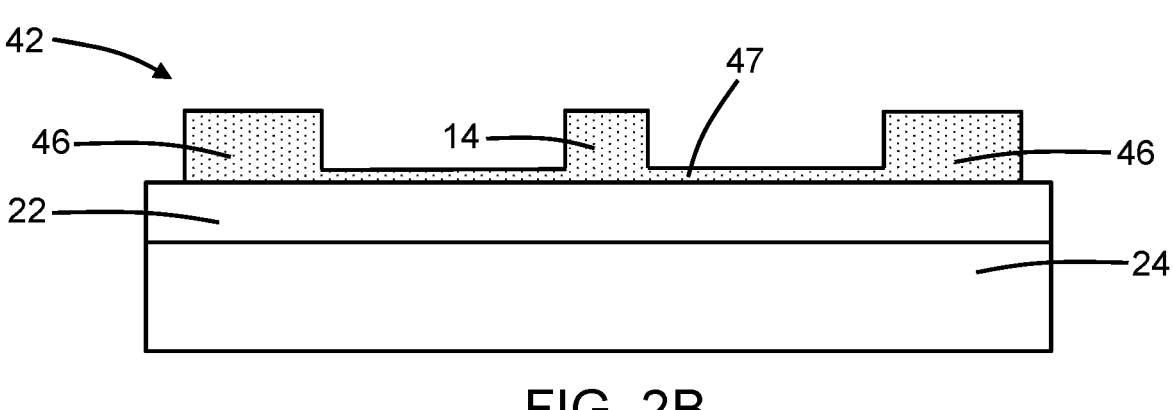
FIG. 2A
FIG. 2B

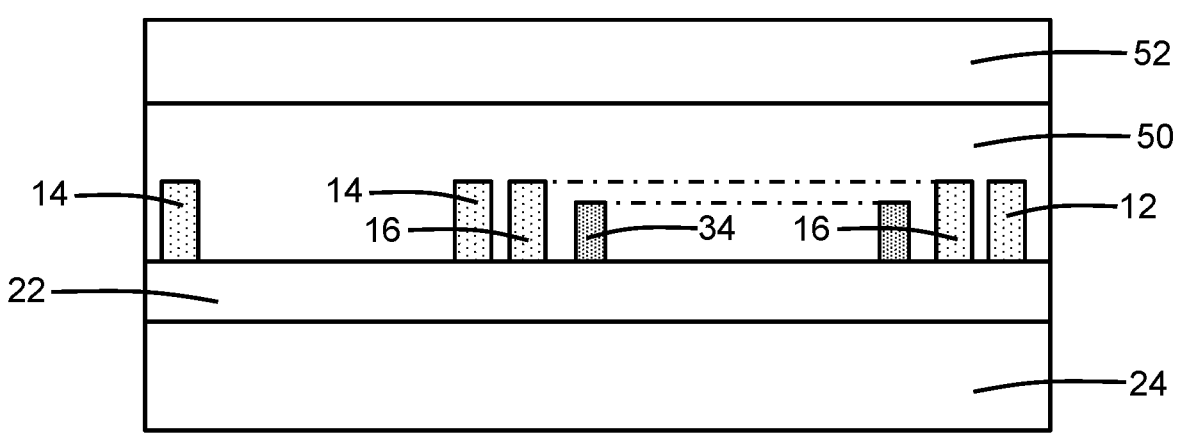
FIG. 3
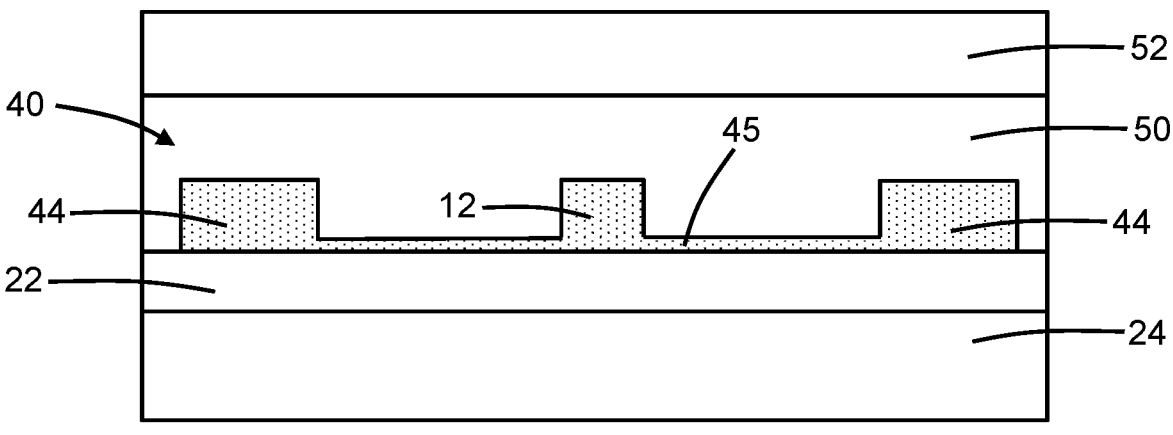
FIG. 3A
FIG. 3B

OPTICAL SWITCHES INCLUDING A RING RESONATOR

BACKGROUND

The disclosure relates to photonics chips and, more specifically, to structures for an optical switch and methods of forming such structures.

Photonics chips are used in many applications and systems including, but not limited to, data communication systems and data computation systems. A photonics chip includes a photonic integrated circuit comprised of photonic components, such as modulators, polarizers, and optical couplers, that are used to manipulate light received from a light source, such as a laser or an optical fiber.

An optical switch is a common photonic component that may be found in a photonic integrated circuit. A Mach-Zehnder interferometer can be used as a base device for an optical switch. An optical coupler splits input light between a pair of arms of the Mach-Zehnder interferometer. A phase difference may be introduced between the light propagating in the different arms to provide a pair of different switched conditions. The arms converge at a downstream optical coupler at which the light is combined. In one switched condition, the phase difference between the light after propagating through the arms is an odd multiple of pi, and the combined light exits from an output port of the output coupler. In the other switched condition, the phase difference between the light after propagating through the arms is an even multiple of pi, and the combined light exits from a different output port of the output coupler.

Conventional optical switches based on a Mach-Zehnder interferometer may be characterized by a high insertion loss that is unacceptable in certain applications or systems. Conventional optical switches based on a Mach-Zehnder interferometer may also suffer from a low extinction ratio and an excessively-large footprint.

Improved structures for an optical switch and methods of forming such structures are needed.

SUMMARY

In an embodiment of the invention, a structure for an optical switch is provided. The structure comprises a first waveguide core including a first portion and a second portion, a second waveguide core including a first portion and a second portion, a ring resonator having a first portion adjacent to the first portion of the first waveguide core and a second portion adjacent to the first portion of the second waveguide core, and an optical coupler coupled to the second portion of first waveguide core and the second portion of the second waveguide core. The first portion of the ring resonator is spaced from the first portion of the first waveguide core by a first gap over a first light coupling region, and the second portion of the ring resonator is spaced from the first portion of the second waveguide core by a second gap over a second light coupling region.

In an embodiment of the invention, a structure for an optical switch is provided. The structure comprises a first waveguide core including a first portion and a second portion, and a second waveguide core including a first portion and a second portion. A first ring resonator is disposed adjacent to the first portion of the first waveguide core, and a second ring resonator is disposed between the first ring resonator and the first portion of the second waveguide core. An optical coupler is coupled to the second portion of the first waveguide core and the second portion of the second waveguide core.

In an embodiment of the invention, a method of forming a structure for an optical switch is provided. The method comprises forming a first waveguide core including a first portion and a second portion, forming a second waveguide core including a first portion and a second portion, forming a ring resonator having a first portion adjacent to the first portion of the first waveguide core and a second portion adjacent to the first portion of the second waveguide core, and forming an optical coupler coupled to the second portion of first waveguide core and the second portion of the second waveguide core. The first portion of the ring resonator is spaced from the first portion of the first waveguide core by a first gap over a first light coupling region, and the second portion of the ring resonator is spaced from the first portion of the second waveguide core by a second gap over a second light coupling region.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

FIG. 2 is a cross-sectional view of the structure taken generally along line 2-2 in FIG. 1.

FIG. 2A is a cross-sectional view of the structure taken generally along line 2A-2A in FIG. 1.

FIG. 2B is a cross-sectional view of the structure taken generally along line 2B-2B in FIG. 1.

FIGS. 3, 3A, 3B are cross-sectional views of the structure at a fabrication stage of the processing method subsequent to FIGS. 2, 2A, 2B.

DETAILED DESCRIPTION

Figure 1:
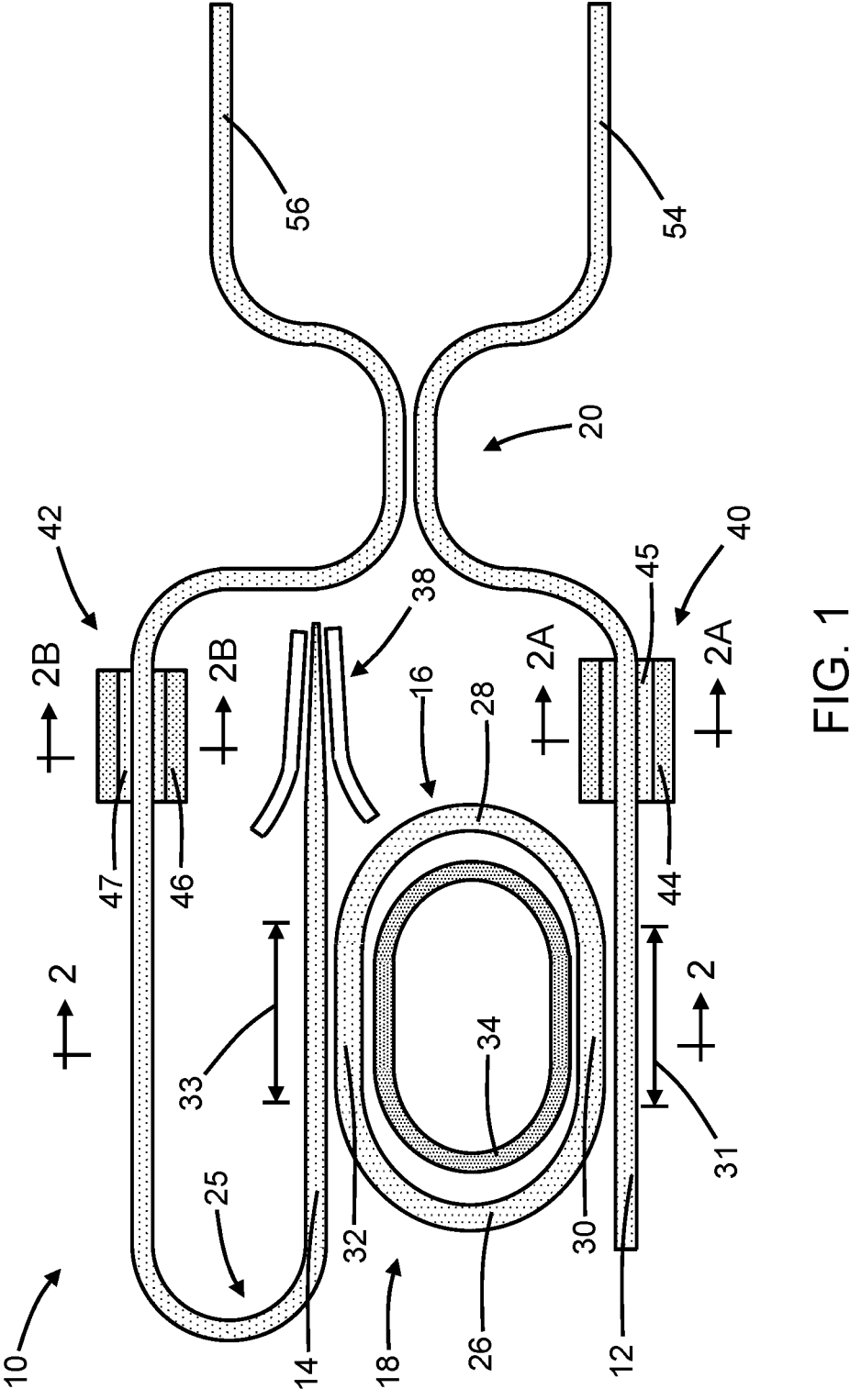
FIG. 1 is a top view of a structure for an optical switch in accordance with embodiments of the invention.

With reference to FIGS. 1, 2, 2A, 2B and in accordance with embodiments of the invention, a structure 10 for an optical switch includes a waveguide core 12, a waveguide core 14, a ring resonator 18 that includes a waveguide core 16 having a closed shape, and an optical coupler 20. A portion of the waveguide core 12 is disposed adjacent to a portion of the ring resonator 18, and a portion of the waveguide core 14 is disposed adjacent to a portion of the waveguide core 16 of the ring resonator 18. The ring resonator 18 is laterally disposed between the portion of the waveguide core 12 and the portion of the waveguide core 14. A portion of the waveguide core 12 upstream from the ring resonator 18 defines an input port for directing light to the structure 10.

The waveguide cores 12, 14, 16 may be disposed on, and over, a dielectric layer 22 and a semiconductor substrate 24 of a photonics chip. In an embodiment, the waveguide cores 12, 14, 16 may be comprised of a semiconductor material, such as single-crystal silicon, that is formed by patterning with lithography and etching processes. In an embodiment, the dielectric layer 22 may be comprised of a dielectric material, such as silicon dioxide, and the semiconductor substrate 24 may be comprised of a semiconductor material, such as single-crystal silicon. In an embodiment, the dielectric layer 22 may be a buried oxide layer of a silicon-on-insulator substrate.

In an embodiment, the ring resonator 18 may be configured with a racetrack or oblong shape that is elongated. In an embodiment, the waveguide core 16 of the ring resonator 18 may include a curved end 26 having a radius of curvature, a curved end 28 having a radius of curvature, and side sections 30, 32 that connect the curved ends 26, 28 to provide the oblong shape. In an embodiment, the side section 30 may be straight or linear such that the width of the gap G1 between the side section 30 of the waveguide core 16 and the adjacent portion of the waveguide core 12, which may also be linear, is constant over a light coupling region 31 configured for light coupling from the waveguide core 12 to the waveguide core 16. In an embodiment, the light coupling region 31 may extend from the juncture between the curved end 26 and side section 30 to the juncture between the curved end 28 and side section 30. In an embodiment, the side section 32 may be straight or linear such that the width of the gap G2 between the side section 32 of the waveguide core 16 and the adjacent portion of the waveguide core 14, which may also be linear, is constant over a light coupling region 33 configured for light coupling from the waveguide core 16 to the waveguide core 14. In an embodiment, the light coupling region 33 may extend from the juncture between the curved end 26 and side section 32 to the juncture between the curved end 28 and side section 32. The length of the side sections 30, 32 may be selected, among other variables, in order to select the coupling length of the light coupling regions 31, 33. The dimension of the widths of the gaps G1, G2 may be selected to select the coupling strength in the light coupling regions 31, 33.

In an alternative embodiment, the ring resonator 18 may be configured with a ring or round shape having an inner and outer diameter in which case the light coupling regions 31, 33 may be shortened. In an alternative embodiment, the ring resonator 18 may be configured with a shape that is neither oblong nor round and in which case the light coupling regions 31, 33 may be non-linear.

The ring resonator 18 may include a heater 34 that is disposed adjacent to the waveguide core 16. In an embodiment, the heater 34 may be disposed inside an inner diameter of the waveguide core 16. In an embodiment, the heater 34 may have a geometrical shape that is similar to the geometrical shape of the waveguide core 16. The heater 34 may be configured to supply heat to the waveguide core 16 that changes the refractive index of the material of the waveguide core 16 in order to provide spectral tuning. In an embodiment, the heater 34 may include a resistive heating element comprised of a doped semiconductor material, such as single-crystal silicon doped with either a p-type dopant or an n-type dopant, and an optional silicide cap. The heater 34 may be powered by a power supply to generate heat by, for example, Joule heating that is conducted to the waveguide core 16.

The waveguide cores 12, 14 include portions that are separately routed from the portions of the waveguide cores 12, 14 adjacent to the ring resonator 18 to the inputs of the optical coupler 20. A portion of the waveguide core 12 downstream from the optical coupler 20 defines an output port 54 for directing light from the structure 10 to a destination, and a portion of the waveguide core 14 downstream from the optical coupler 20 defines another output port 56 for directing light from the structure 10 to a different destination. The waveguide core 14 includes an open end that may be coupled to a terminator 38, which may be configured as an absorber.

The waveguide core 14 includes a bend 25 that redirects the routing of the waveguide core 14 in the layout toward the optical coupler 20. In an embodiment, the bend 25 may have a curvature of about 180° such that the waveguide core 14 is redirected to be aligned substantially parallel to the waveguide core 12 prior to being connected to one of the inputs to the optical coupler 20. The bend 25 enables the positioning of the ring resonator 18 in the layout of the structure 10 adjacent to both of the waveguide cores 12, 14 to provide the light coupling regions 31, 33. In an embodiment, the portion of the waveguide core 14 between the ring resonator 18 and the optical coupler 20 and the portion of the waveguide core 12 between the ring resonator 18 and the optical coupler 20 may have equal lengths.

A phase shifter 40 is disposed adjacent to a portion of the waveguide core 12 between the ring resonator 18 and the optical coupler 20 and is thereby associated with the adjacent portion of the waveguide core 12. A phase shifter 42 is disposed adjacent to a portion of the waveguide core 14 between the ring resonator 18 and the optical coupler 20 and is thereby associated with the adjacent portion of the waveguide core 14. In an embodiment, the phase shifter 40 may be a thermo-optic phase shifter that includes a pair of resistive heating elements 44 disposed on opposite sides of the waveguide core 12 and a slab layer 45 that extends laterally to physically connect the resistive heating elements 44 to the adjacent portion of the waveguide core 12. In an embodiment, the phase shifter 42 may be a thermo-optic phase shifter that includes a pair of resistive heating elements 46 disposed on opposite sides of the waveguide core 12 and a slab layer 47 that extends laterally to physically connect the resistive heating elements 46 to the adjacent portion of the waveguide core 14. The slab layers 45, 47 may be thinner than the waveguide cores 12, 14, and the slab layers 45, 47 may comprise the same material as the waveguide cores 12, 14. In an embodiment, the resistive heating elements 44, 46 may be comprised of a doped semiconductor material, such as single-crystal silicon doped to include a p-n junction. In alternative embodiments, the phase shifter 40 may be replaced by an electro-optic phase shifter, a lithium niobate-based phase shifter, a barium titanate-based phase shifter, a polymer-based phase shifter, a two-dimensional material-based phase shifter, or a microelectromechanical system-based phase shifter.

The resistive heating elements 44 of the phase shifter 40 are configured to generate heat by Joule heating under the control of a variable electrical signal, and the generated heat is transferred by thermal conduction from the resistive heating elements 44 to the physically connected portion of the waveguide core 12. The slab layer 45 provides a thermal path for thermal conduction of the heat to the connected portion of the waveguide core 12. The temperature of the connected portion of the waveguide core 12 is locally elevated by the transferred heat. The localized temperature variation experienced by the connected portion of the waveguide core 12 is effective to change the refractive index of its constituent material through the thermo-optic effect and to thereby alter the phase of light propagating in the heated portion of the waveguide core 12.

The resistive heating elements 46 of the phase shifter 42 are configured to generate heat by Joule heating under the control of a variable electrical signal, and the generated heat is transferred by thermal conduction from the resistive heating elements 46 to the physically-connected portion of the waveguide core 14. The slab layer 47 provides a thermal path for thermal conduction of the heat to the connected portion of the waveguide core 14. The temperature of the connected portion of the waveguide core 14 is locally elevated by the transferred heat. The localized temperature variation experienced by the connected portion of the waveguide core 14 is effective to change the refractive index of its constituent material through the thermo-optic effect and to thereby alter the phase of light propagating in the heated portion of the waveguide core 14.

The phase shifters 40, 42 selectively alter the phase of the light to provide the switching action that occurs when the light is combined by the output optical coupler 20. In an alternative embodiment, the phase shifter 40 may be omitted from the structure 10 such that only the phase shifter 42 is present. In an alternative embodiment, the phase shifter 42 may be omitted from the structure 10 such that only the phase shifter 40 is present.

In an embodiment, the optical coupler 20 may be a directional coupler in which the waveguide core 12 and the waveguide core 14 are routed with a proximity characterized by a spacing that supports light transfer. Light is output from the optical coupler 20 to the output ports 54, 56, which are defined in the representative embodiment by portions of the waveguide cores 12, 14 that are downstream from the optical coupler 20.

In use, the optical switch embodied in the structure 10 may be used to switch the output from the output optical coupler 20 between the different output ports 54, 56. A portion of the light arriving as optical signals in the waveguide core 12 is transferred by the ring resonator 18 to the waveguide core 14. Light propagating in the waveguide core 12 may be subject to a phase delay downstream from the ring resonator 18 that is variable under the control of the phase shifter 40. Light propagating in the optical path defined by the waveguide core 14 may be subject to a phase delay that is variable under the control of the phase shifter 42. The optical coupler 20 may combine the light arriving at its inputs from the waveguide cores 12, 14 to provide either constructive or destructive interference contingent upon the values of the phase delays between the different optical paths. In an embodiment, light exiting the output optical coupler 20 may be routed to the output port 54 if the phase delay is zero and may be routed to the output port 56 if the phase delay is equal to pi, which represents one-half of an operating wavelength.

In an embodiment, the light wavelength for the different output states may depend on the coupling coefficient between the waveguide core 12 and the ring resonator 18, the coupling coefficient between the waveguide core 14 and the ring resonator 18, and the circumference of the ring resonator 18. In an embodiment, the coupling coefficient between the waveguide core 12 and the ring resonator 18 may be equal to the coupling coefficient between the waveguide core 14 and the ring resonator 18. In an embodiment, the coupling coefficient between the waveguide core 12 and the ring resonator 18 may be unequal to the coupling coefficient between the waveguide core 14 and the ring resonator 18.

The waveguide core 12 may define a through-port associated with the ring resonator 18. The waveguide core 14 may define a drop-port associated with the ring resonator 18.

Portions of the waveguide cores 12, 14 are routed to the inputs of optical coupler 20, and light is supplied by the waveguide cores 12, 14 to the inputs of the optical coupler 20 with a phase offset supplied by the operation of the phase shifters 40, 42. For a single wavelength operation, the structure 10 operates as an optical switch. The optical switch embodied in the structure 10 may be characterized by an insertion loss that is less than the insertion loss exhibited by conventional optical switches. The optical switch embodied in the structure 10 may also be characterized by an extinction ratio that is greater than the extinction ratio exhibited by conventional optical switches. The optical switch embodied in the structure 10 may also be characterized by a more compact footprint than a conventional optical switch. In an embodiment, the optical switch embodied in the structure 10 may be bidirectional.

In an alternative embodiment, the structure 10 may operate as a de-interleaver that is configured to route selected wavelengths of light from among multiple operating wavelengths to one or the other of the output ports 54, 56. For a phase delay equal to pi, the selected wavelengths exiting the pair of output ports 54, 56 can be inverted.

With reference to FIGS. 3, 3A, 3B and at a fabrication stage subsequent to FIGS. 2, 2A, 2B, a dielectric layer 50 may be formed over the structure 10. The dielectric layer 50 may be comprised of a dielectric material, such as silicon dioxide, that is deposited and then planarized following deposition. A back-end-of-line stack 52 may be formed over the dielectric layer 50. The back-end-of-line stack 52 may include stacked interlayer dielectric layers in which each interlayer dielectric layer is comprised of a dielectric material, such as silicon dioxide, silicon nitride, tetraethylorthosilicate silicon dioxide, or fluorinated-tetraethylorthosilicate silicon dioxide.

Figure 4:
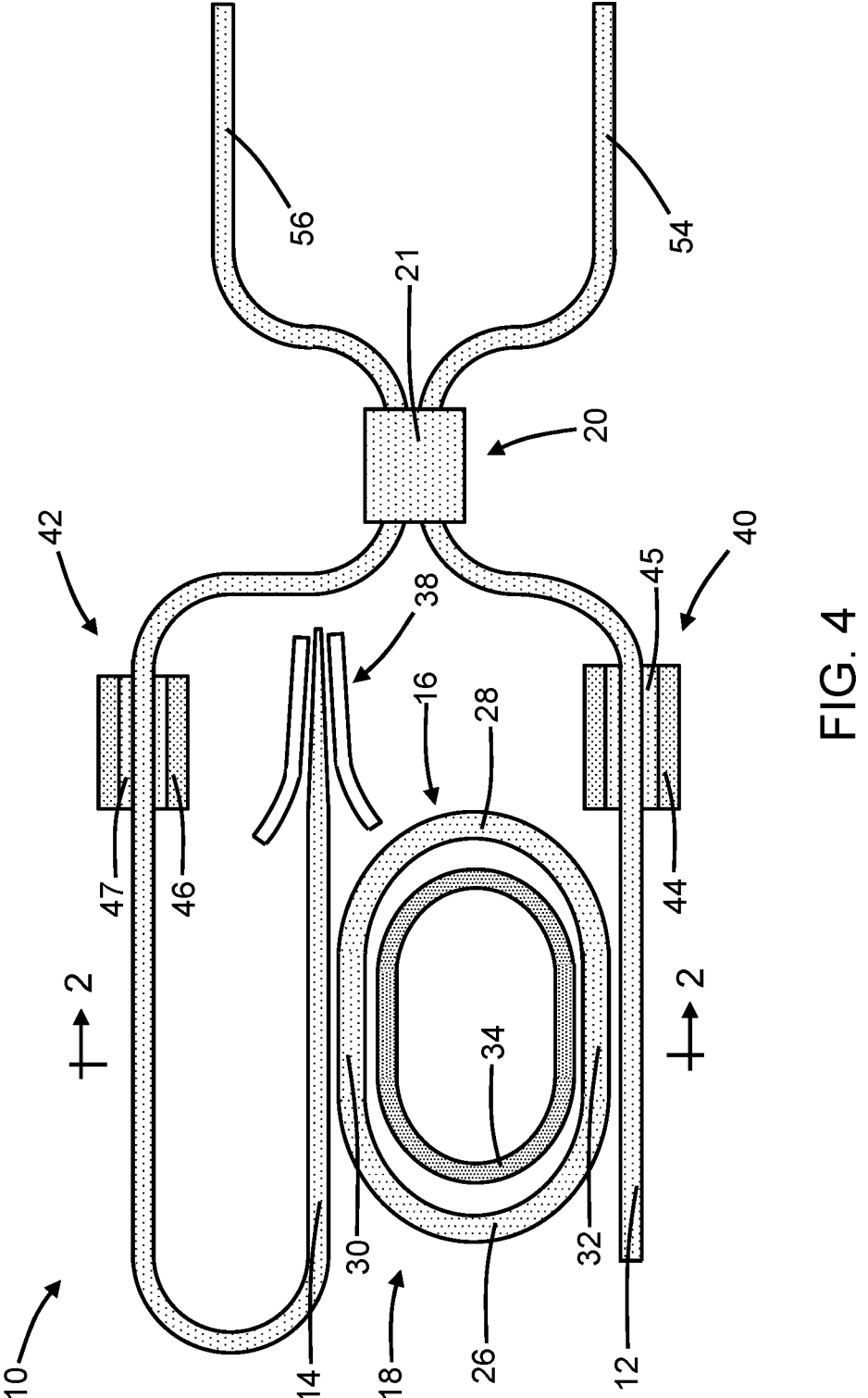
FIG. 4 is a top view of a structure for an optical switch in accordance with alternative embodiments of the invention.

With reference to FIG. 4 and in accordance with alternative embodiments of the invention, the optical coupler 20 may be configured as a multi-mode interference coupler instead of a directional coupler. In an embodiment, the output optical coupler 20 may include a multi-mode interference region 21 with an input connected to the portion of the waveguide core 12 associated with the phase shifter 40 and another input connected to the portion of the waveguide core 14 associated with the phase shifter 42. The multi-mode interference region 21 is configured to combine the light received from the waveguide cores 12, 14 with either constructive or destructive interference contingent upon the phase shifts imparted to the light by the phase shifters 40, 42. The multi-mode interference region 21 includes output ports 54, 56 to which the combined light is directed depending upon the different phase shifts.

Figure 5:
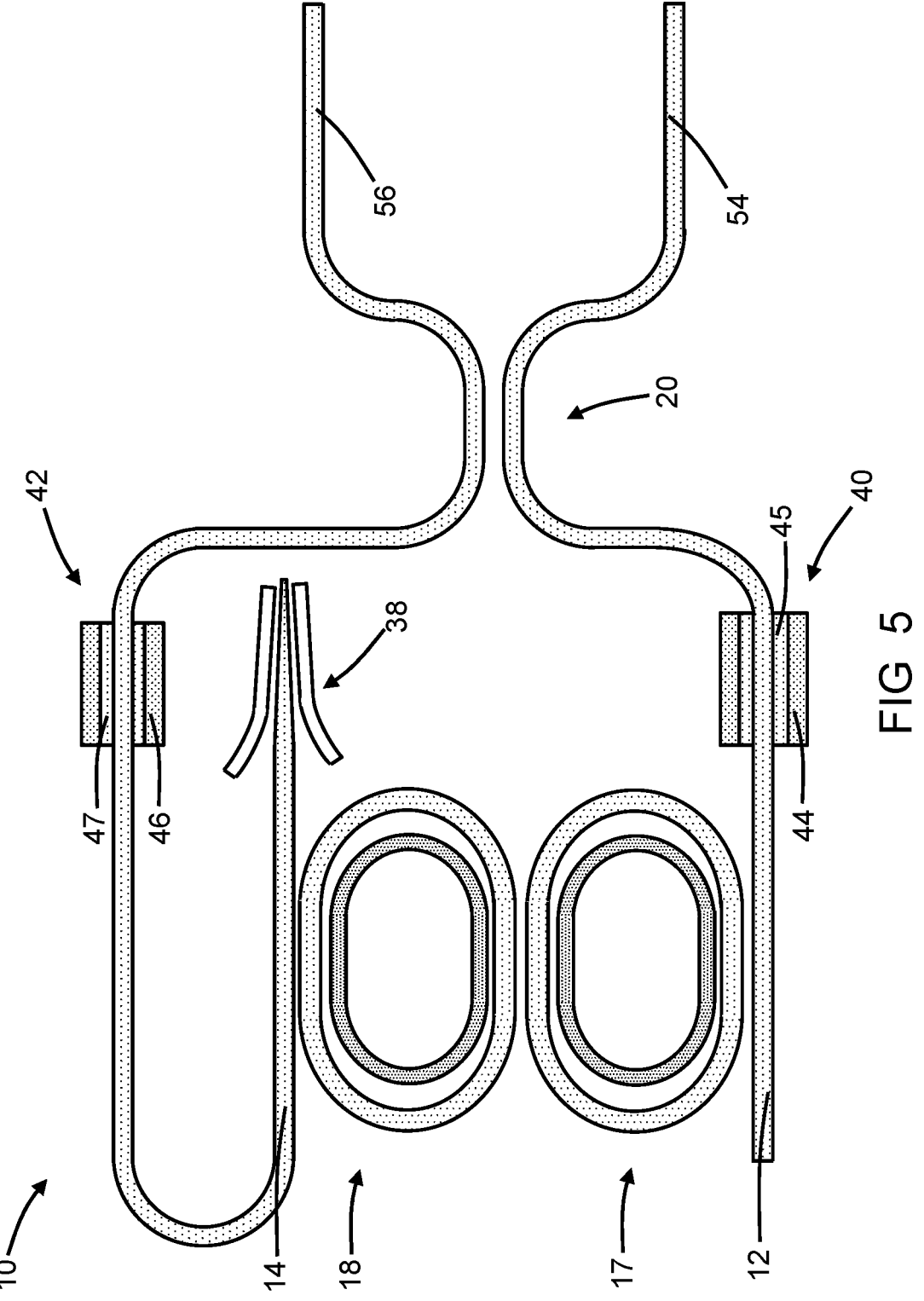
FIG. 5 is a top view of a structure for an optical switch in accordance with alternative embodiments of the invention.

With reference to FIG. 5 and in accordance with alternative embodiments of the invention, a ring resonator 17 may be disposed along with the ring resonator 18 between the portions of the waveguide cores 12, 14. Light is coupled from the waveguide core 12 through the ring resonators 17, 18 to the waveguide core 14. More specifically, a portion of the light propagating in the waveguide core 12 is transferred to the ring resonator 17, light propagating in the ring resonator 17 is transferred to the ring resonator 18, and light propagating in the ring resonator 18 is transferred to the adjacent portion of the waveguide core 14. In an alternative embodiment, additional ring resonators may be disposed between the ring resonator 17 and the ring resonator 18.

Figure 6:
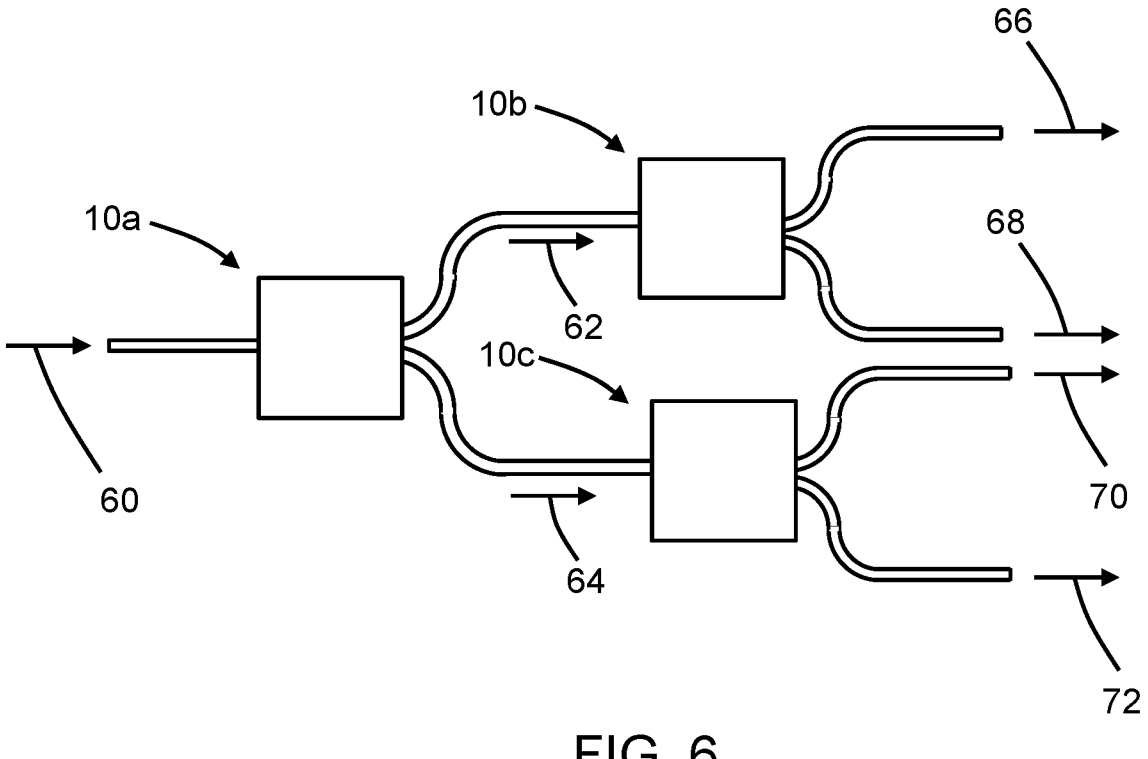
FIG. 6 is a diagrammatic view of a structure dense wavelength-division multiplexing (DWDM) switch in accordance with alternative embodiments of the invention.

With reference to FIG. 6 and in accordance with alternative embodiments of the invention, multiple instances of the structure 10, namely structures 10a, 10b, 10c may be cascaded to form a dense wavelength-division multiplexing (DWDM) switch. The structure 10*a* has an input port, an output port coupled to an input port of the structure 10*b*, and an output port coupled to an input port of the structure 10*c*. The input port of the structure 10*a* receives light 60 that includes optical signals having multiple wavelengths, which are split in a wavelength-dependent manner to output light 62 including optical signals with certain wavelengths to the structure 10*b* and output light 64 including optical signals with certain wavelengths to the structure 10*c*. The wavelengths of the optical signals output from the structure 10*a* to the structure 10*b* may differ from the wavelengths of the optical signals output from the structure 10*a* to the structure 10*c*. The light 62 received at the input port of the structure 10*b* is output from one of its output ports as light 66 including optical signals with certain wavelengths and from the other of its output ports as light 68 including optical signals with certain wavelengths. The light received at the input port of the structure 10*c* is output from one of its output ports as light 70 including optical signals with certain wavelengths and from one of its output ports as light 72 including optical signals with certain wavelengths.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an optical switch, the structure comprising:
    a first waveguide core including a first portion and a second portion;
    a second waveguide core including a first portion and a second portion; a ring resonator having a first portion adjacent to the first portion of the first waveguide core and a second portion adjacent to the first portion of the second waveguide core, the first portion of the ring resonator spaced from the first portion of the first waveguide core by a first gap over a first light coupling region, and the second portion of the ring resonator spaced from the first portion of the second waveguide core by a second gap over a second light coupling region;
    an optical coupler coupled to the second portion of the first waveguide core and the second portion of the second waveguide core;
    a first phase shifter associated with the first portion of the first waveguide core, the first phase shifter arranged between the ring resonator and the optical coupler; and
    a second phase shifter associated with the first portion of the second waveguide core, the second phase shifter arranged between the ring resonator and the optical coupler.

2. The structure of claim 1 wherein the first phase shifter is a thermo-optic phase shifter that includes a first resistive heating element and a second resistive heating element.

3. The structure of claim 2 wherein the second phase shifter is a thermo-optic phase shifter that includes a first resistive heating element and a second resistive heating element.

4. The structure of claim 1 wherein the second portion of the first waveguide core is disposed between the first portion of the first waveguide core and the optical coupler.

5. The structure of claim 4 wherein the second portion of the second waveguide core is disposed between the first portion of the second waveguide core and the optical coupler.

6. The structure of claim 5 wherein the second portion of the second waveguide core is longer than the second portion of the first waveguide core.

7. The structure of claim 1 wherein the optical coupler is a directional coupler that includes a third portion of the first waveguide core and a third portion of the second waveguide core adjacent to the third portion of the first waveguide core.

8. The structure of claim 1 wherein the optical coupler is a multimode interference coupler that includes a first input coupled to the second portion of the first waveguide core and a second input coupled to the second portion of the second waveguide core.

9. The structure of claim 1 wherein the first gap is constant over the first light coupling region, and the second gap is constant over the second light coupling region.

10. The structure of claim 1 wherein the ring resonator is a third waveguide core with an oblong shape having a first side section and a second side section, the first portion of the ring resonator includes the first side section of the third waveguide core, and the second portion of the ring resonator includes the first side section of the third waveguide core.

11. The structure of claim 10 wherein the first gap has a first width that is constant between the first side section and the first portion of the first waveguide core over the first light coupling region, and the second gap has a second width that is constant between the second side section and the first portion of the second waveguide core over the second light coupling region.

12. The structure of claim 1 further comprising:

a semiconductor substrate; and a dielectric layer on the semiconductor substrate, wherein the first waveguide core, the second waveguide core, the ring resonator, and the optical coupler are disposed on the dielectric layer.

13. The structure of claim 1 wherein the second portion of the second waveguide core includes a bend having a curvature configured to route the second waveguide core away from the first waveguide core, and the bend has a curvature of about 180°.

14. The structure of claim 13 wherein the second portion of the second waveguide core and the second portion of the first waveguide core have equal lengths.

15. The structure of claim 13 further comprising:

a terminator, wherein the first waveguide core includes a portion upstream from the ring resonator defining an input port for directing light to the structure, and the second waveguide core includes an open end that is coupled to the terminator.

16. A structure for an optical switch, the structure comprising:

a first waveguide core including a first portion and a second portion;

a second waveguide core including a first portion and a second portion;

a first ring resonator disposed adjacent to the first portion of the first waveguide core;

a second ring resonator disposed between the first ring resonator and the first portion of the second waveguide core;

an optical coupler coupled to the second portion of the first waveguide core and the second portion of the second waveguide core;

a first phase shifter associated with the first portion of the first waveguide core, the first phase shifter arranged between the first and second ring resonators and the optical coupler; and a second phase shifter associated with the first portion of the second waveguide core, the second phase shifter arranged between the first and second ring resonators and the optical coupler.

17. The structure of claim 16 wherein the second portion of the second waveguide core includes a bend having a curvature configured to route the second waveguide core away from the first waveguide core, and the bend has a curvature of about 180°.

18. The structure of claim 17 further comprising:

a terminator, wherein the first waveguide core includes a portion upstream from the first ring resonator defining an input port for directing light to the structure, and the second waveguide core includes an open end that is coupled to the terminator.

19. A method of forming a structure for an optical switch, the method comprising:

forming a first waveguide core that includes a first portion and a second portion;

forming a second waveguide core that includes a first portion and a second portion;

forming a ring resonator having a first portion adjacent to the first portion of the first waveguide core and a second portion adjacent to the first portion of the second waveguide core, wherein the first portion of the ring resonator is spaced from the first portion of the first waveguide core by a first gap over a first coupling region, and the second portion of the ring resonator is spaced from the first portion of the second waveguide core by a second gap over a second coupling region;

forming an optical coupler that is coupled to the second portion of the first waveguide core and the second portion of the second waveguide core;

forming a first phase shifter associated with the first portion of the first waveguide core, wherein the first phase shifter is arranged between the ring resonator and the optical coupler; and forming a second phase shifter associated with the first portion of the second waveguide core, wherein the second phase shifter arranged between the ring resonator and the optical coupler.

20. The method of claim 19 wherein the second portion of the second waveguide core includes a bend having a curvature configured to route the second waveguide core away from the first waveguide core, the bend has a curvature of about 180°, the first waveguide core includes a portion upstream from the ring resonator defining an input port for directing light to the structure, and the second waveguide core includes an open end that is coupled to a terminator.

\* \* \* \* \*